US010172145B2

(12) United States Patent
Hazebrouck et al.

(10) Patent No.: US 10,172,145 B2
(45) Date of Patent: Jan. 1, 2019

(54) PHONE-AS-A-KEY LOCALIZATION BASED ON OBJECT DETECTION

(71) Applicant: Ford Global Technologies, LLC, Dearborn, MI (US)

(72) Inventors: Laura Viviana Hazebrouck, Birmingham, MI (US); John Robert Van Wiemeersch, Novi, MI (US); Aaron DeLong, Toledo, OH (US); Vivekanandh Elangovan, Canton, MI (US); Hamid M Golgiri, Westland, MI (US); Erick Michael Lavoie, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/421,179

(22) Filed: Jan. 31, 2017

(65) Prior Publication Data

US 2018/0220429 A1  Aug. 2, 2018

(51) Int. Cl.
  *H04W 72/08*  (2009.01)
  *H04M 1/725*  (2006.01)
  *H04B 1/3822*  (2015.01)

(52) U.S. Cl.
  CPC ........ *H04W 72/085* (2013.01); *H04B 1/3822* (2013.01); *H04M 1/7253* (2013.01); *H04M 1/72533* (2013.01)

(58) Field of Classification Search
  CPC .............. H04B 1/3822; H04M 1/7253; H04M 1/72533; H04W 72/085
  See application file for complete search history.

(56) References Cited

U.S. PATENT DOCUMENTS

| 8,792,826 B2 | 7/2014 | Willis |
| 2009/0136035 A1 | 5/2009 | Lee |
| 2012/0244877 A1 | 9/2012 | Margalef et al. |

(Continued)

FOREIGN PATENT DOCUMENTS

| DE | 102012020414 A1 | 4/2014 |
| JP | 2000054707 A | 2/2000 |

(Continued)

OTHER PUBLICATIONS

Strengthening Zero-interaction Authentication Using Contextualcopresence Detection, Xiang Gao, (May 28, 2014), Department of Computer Science, University of Helsinki.

(Continued)

*Primary Examiner* — Bo Hui A Zhu
(74) *Attorney, Agent, or Firm* — James P. Muraff; Neal, Gerber & Eisenberg LLP (57) ABSTRACT

Method and apparatus are disclosed for phone-as-a-key localization based on object detection. An example disclosed vehicle includes sensors, wireless nodes, and a phone key unit. The example sensors detect objects around the vehicle. The example wireless nodes receive RSSI values from a mobile device. The example phone key unit determines a quantity of the objects around the vehicle. The example phone key unit also determines a first RSSI threshold based on the quantity. Additionally, in response to an average of a portion of the RSSI values satisfying the first RSSI threshold, the phone key unit primes a door of the vehicle.

16 Claims, 5 Drawing Sheets

(56) References Cited

U.S. PATENT DOCUMENTS

| | | | |
|---|---|---|---|
| 2015/0048927 A1 | 2/2015 | Simmons | |
| 2015/0149042 A1 | 5/2015 | Cooper et al. | |
| 2015/0235486 A1 | 8/2015 | Ellis et al. | |
| 2015/0362997 A1 | 12/2015 | Hatton | |
| 2016/0042644 A1* | 2/2016 | Velusamy | H04W 4/70 340/435 |
| 2016/0277911 A1* | 9/2016 | Kang | H04W 4/90 |
| 2017/0113652 A1* | 4/2017 | Tokudome | B60R 25/2036 |
| 2017/0346878 A1* | 11/2017 | Baker | H04B 1/3822 |
| 2018/0088577 A1* | 3/2018 | Kim | G05D 1/0088 |

FOREIGN PATENT DOCUMENTS

| | | | |
|---|---|---|---|
| JP | 2002021398 A | 1/2002 |
| JP | 2005133491 A | 5/2005 |
| JP | 2012158948 A | 8/2012 |

OTHER PUBLICATIONS

Search Report dated Jul. 18, 2018 for GB Patent Application No. GB 1801446.4 (4 pages).

* cited by examiner

PHONE-AS-A-KEY LOCALIZATION BASED ON OBJECT DETECTION

TECHNICAL FIELD

The present disclosure generally relates to remotely controlling subsystems of a vehicle and, more specifically, phone-as-a-key localization based on object detection.

BACKGROUND

Phone-as-a-key (PAAK) technology facilitates accessing functions traditionally associated with a key fob via an app executing on a smart phone. The smart phone executing the PAAK app communicates with vehicles via a wireless network. However, the vehicles, such as cars and trucks, are often parked in areas with poor electromagnetic characteristics that block or attenuate communication between a phone and the vehicle. Additionally, other devices that share the frequency band in the vicinity of the vehicle can cause interference. Both poor electromagnetic characteristics and interference on the frequency band can shorten the operable range of the PAAK features.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example embodiments are disclosed for phone-as-a-key localization based on object detection. An example disclosed vehicle includes sensors, wireless nodes, and a phone key unit. The example sensors detect objects around the vehicle. The example wireless nodes receive RSSI values from a mobile device. The example phone key unit determines a quantity of the objects around the vehicle. The example phone key unit also determines a first RSSI threshold based on the quantity. Additionally, in response to an average of a portion of the RSSI values satisfying the first RSSI threshold, the phone key unit primes a door of the vehicle.

An example disclosed method includes detecting, with range detection sensors, objects around the vehicle. The example method also includes receiving, from a plurality of wireless nodes, RSSI values from a mobile device. The example method includes determining a quantity of the objects around the vehicle. Additionally, the example method includes determining a first RSSI threshold based on the quantity, and in response to an average of a portion of the RSSI values satisfying the first RSSI threshold, priming a door of the vehicle.

An example disclosed tangible computer readable medium includes instructions that, when executed cause an example vehicle to (a) detect, with range detection sensors, objects around the vehicle, (b) receive, from a plurality of wireless nodes, RSSI values from a mobile device (c) determine a quantity of the objects around the vehicle, (d) determine a first RSSI threshold based on the quantity, and (e) in response to an average of a portion of the RSSI values satisfying the first RSSI threshold, prime a door of the vehicle.

BRIEF DESCRIPTION OF THE DRAWINGS

For a better understanding of the invention, reference may be made to embodiments shown in the following drawings.

The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

Increasingly, passive entry and passive start (PEPS) systems are being included in vehicles. PEPS systems facilitate customers entering and driving their vehicles without interacting with a key fob. These PEPS systems use a combination of low frequency (LF) (e.g. 125 kHz) and ultra high frequency (UHF) (e.g. 310 MHz, 315 MHz, etc.) communication to detect and localize key fobs. Antennas in the vehicle transmit LF signals to the key fob. The key fob sends the received signal strength (RSSI) of these signals back to the vehicle via UHF communication. The vehicle determines the location of the key fob based on a predefined table of RSSI to distance values. The PEPS system sets thresholds for passive entry and passive start to activate the respective functions when the mobile device is within range of the threshold.

A phone-as-a-key (PaaK) system employs personal area networks (e.g. Bluetooth® Low Energy (BLE), etc.) to detect and localize mobile phones. Generally, a network controller to communicate over the personal area networks is a standard feature on mobile devices. In such a manner, the PaaK system can be deployed on the mobile devices without requiring specialized antenna and controllers to communicate over other frequencies (e.g., 125 kHz, 315 MHz, etc.). Like the key fob-based PEPS system, the PaaK system includes the passive entry, passive start and illuminated welcome features. However, because personal area networks use a relatively high frequency (e.g., the 2.4 GHz band), signals from the PaaK system have a greater chance of being reflected and attenuated by objects or persons in and around the vehicle compared to low frequency radiation (e.g., 125 kHz) of the key fob-based system. Because of the greater chance of reflections and attenuation in the frequency bands used by personal area networks, accurately determine the location of a mobile phone when using predefined RSSI distance values is difficult. Therefore, because of the technical problems rooted in using personal area networks, setting reliable passive entry and welcome mode thresholds is difficult.

As disclosed below, accuracy of a localizing a mobile device in a PaaK system using a personal area network is improved by accounting for objects in the vicinity of the vehicle. Accuracy of thresholds for passive entry and welcome mode zones is increased when the RSSI thresholds for these zones are adjusted according to the vehicle. A PaaK unit on the vehicle is communicatively coupled to range detections sensors (e.g., ultrasonic sensors, camera(s), RADAR, and/or LiDAR, etc.) and/or a vehicle-to-vehicle communication system (e.g., Dedicated Short Range Communication (DSRC), etc.). The range detections sensors detect objects (e.g., walls, pillars, other vehicles, etc.). The vehicle-to-vehicle communication system communicates with other vehicles to detect those vehicles in the vicinity.

When the PaaK unit initially detects the mobile device, it activates the range detections sensors and/or the vehicle-to-vehicle communication system to detect objects in the vicinity of the vehicle. The PaaK unit categorizes the density of objects in the vicinity of the vehicle. In some examples, the PaaK unit categorizes the density of objects into three categories. In a first category (e.g., a "High Density" category), the PaaK unit detects multiple large objects around the vehicle. In a second category (e.g., a "Medium Density" category), the PaaK unit detects a few objects around the vehicle. In a third category (e.g., a "Low Density" category), the PaaK unit detects no objects around the vehicle. The PaaK unit adjusts the RSSI thresholds for the passive entry and welcome mode zones based on the detected category.

Figure 1:
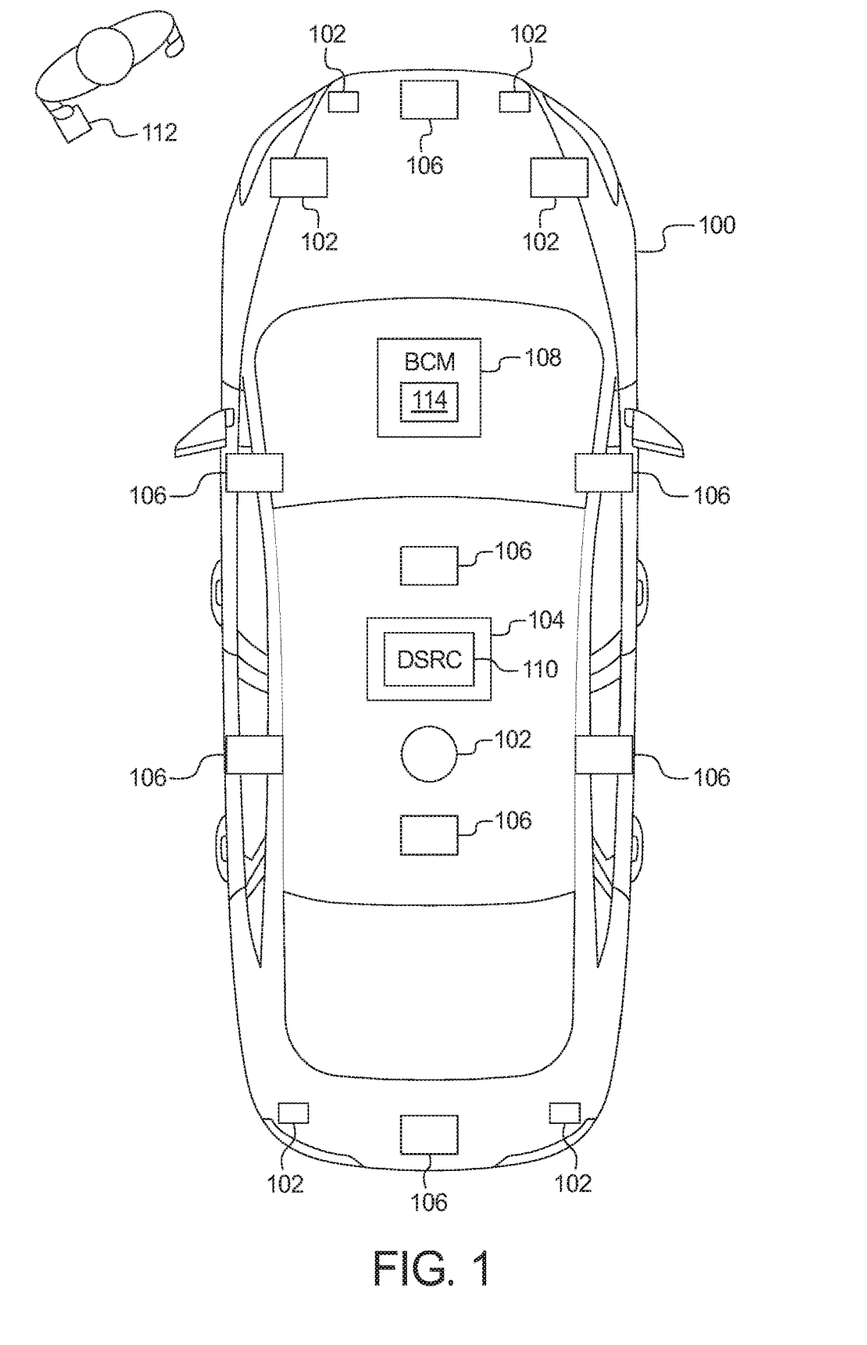
FIG. 1 illustrates a vehicle operating in accordance with the teachings of this disclosure.

FIG. 1 illustrates a vehicle 100 operating in accordance with the teachings of this disclosure. The vehicle 100 may be a standard gasoline powered vehicle, a hybrid vehicle, an electric vehicle, a fuel cell vehicle, and/or any other mobility implement type of vehicle. The vehicle 100 includes parts related to mobility, such as a powertrain with an engine, a transmission, a suspension, a driveshaft, and/or wheels, etc. The vehicle 100 may be non-autonomous, semi-autonomous (e.g., some routine motive functions controlled by the vehicle 100), or autonomous (e.g., motive functions are controlled by the vehicle 100 without direct driver input). In the illustrated example the vehicle 100 includes sensors 102, an on-board communications platform 104, wireless nodes 106, and a body control module 108.

The sensors may be arranged in and around the vehicle 100 in any suitable fashion. The sensors may be mounted inside the cabin of the vehicle 100 or in the body of the vehicle 100 (such as, the engine compartment, the wheel wells, etc.) to measure properties in the interior of the vehicle 100. For example, such sensors may include accelerometers, odometers, tachometers, pitch and yaw sensors, wheel speed sensors, microphones, tire pressure sensors, and biometric sensors, etc. In the illustrated example, the sensors include one or more range detection sensors 102 mounted to measure properties around the exterior of the vehicle 100. The range detection sensors 102 are mounted on the vehicle 100 to detect objects (e.g., people, vehicles, walls, etc.) in the vicinity of the vehicle 100. The range detection sensors 102 may include ultrasonic sensors, RADAR, LiDAR, cameras, and/or infrared sensors, etc. The range detection sensors 102 detect the distance and/or relative size of the objects from the vehicle 100.

The on-board communications platform 104 includes wireless network interfaces to enable communication with external networks. The on-board communications platform 104 also includes hardware (e.g., processors, memory, storage, antenna, etc.) and software to control the wired or wireless network interfaces. In some examples, the on-board communications platform 104 includes a cellular model (e.g., including protocols such as Global System for Mobile Communications (GSM), Universal Mobile Telecommunications System (UMTS), Long Term Evolution (LTE), Code Division Multiple Access (CDMA), etc.) and/or a wireless local area network module (including IEEE 802.11 a/b/g/n/ac or others) In the illustrated example, the on-board communications platform 104 includes a Dedicated Short Range Communication (DSRC) module 110 to detect other vehicles in the vicinity of the vehicle 100. The example DSRC module 110 includes antenna(s), radio(s) and software to broadcast messages and to establish communication between the vehicle 100 and other vehicles in the vicinity also equipped with a DSRC module, infrastructure-based modules (not shown), and mobile device-based modules (not shown). More information on the DSRC network and how the network may communicate with vehicle hardware and software is available in the U.S. Department of Transportation's Core June 2011 System Requirements Specification (SyRS) report (available at http://www.its.dot.gov/meetings/pdf/CoreSystem_SE_SyRS_RevA%20(2011-06-13).pdf), which is hereby incorporated by reference in its entirety along with all of the documents referenced on pages 11 to 14 of the SyRS report. DSRC systems incorporating infrastructure information is known as a "roadside" system. DSRC may be combined with other technologies, such as Global Position System (GPS), Visual Light Communications (VLC), Cellular Communications, and short range radar, facilitating the vehicles communicating their position, speed, heading, relative position to other objects and to exchange information with other vehicles or external computer systems.

Currently, the DSRC network is identified under the DSRC abbreviation or name. However, other names are sometimes used, usually related to a Connected Vehicle program or the like. Most of these systems are either pure DSRC or a variation of the IEEE 802.11 wireless standard. However, besides the pure DSRC system it is also meant to cover dedicated wireless communication systems between cars and roadside infrastructure system, which are integrated with GPS and are based on an IEEE 802.11 protocol for wireless local area networks (such as, 802.11p, etc.).

In the illustrated example, the wireless nodes 106 are positioned around the vehicle 100. For example, the wireless nodes 106 may be installed near a driver's side front door, a driver's side rear door, a passenger's side front door, a passenger's side rear door, in the front of the vehicle 100, and/or in the rear of the vehicle 100. Additionally, the vehicle 100 includes one of the wireless nodes 106 inside the vehicle 100 to facilitate determining whether a mobile device 112 is inside or outside the vehicle 100. When activated, the wireless nodes 106 establish connections with the mobile device(s) 112 that have been paired to the wireless nodes 106. The mobile device(s) 112 may be paired with the wireless nodes 106 during a setup process via an infotainment head unit. The example wireless nodes 106 implement Bluetooth Low Energy (BLE). The BLE protocol is set forth in Volume 6 of the Bluetooth Specification 4.0 (and subsequent revisions) maintained by the Bluetooth Special Interest Group.

Messages exchanged between the mobile device(s) 112 and the wireless nodes 106 include the RSSI and/or the RX values between the mobile device(s) 118 and the wireless nodes 106. The RSSI and RX values measure the open-path signal strength of the radio frequency signal as received by the mobile device 112 (e.g., e.g., a smart phone, a smart watch, etc.) from the corresponding wireless node 106. The RSSI is measured in signal strength percentage, the values (e.g., 0-100, 0-137, etc.) of which are defined by a manufacturer of hardware used to implement the wireless nodes 106. Generally, a higher RSSI means that the mobile device 112 is closer to the corresponding wireless nodes 106. The RX values are measured in Decibel-milliWatts (dBm). For example, when the mobile device 112 is one meter (3.28 feet) away, the RX value may be −60 dBm, and when the mobile device is two meters (6.56 feet) away, the RX value may be −66 dBm. The RSSI/RX values are used to determine the radial distance from the mobile device 112 to the particular wireless nodes 106. In some examples, using trilateration, the wireless nodes 106 are used to determine the location(s) of the mobile device(s) 112 relative to the vehicle 100.

The body control module 108 controls various subsystems of the vehicle 100. For example, the body control module 108 may control power windows and power locks (e.g., via a door control unit, etc.), an immobilizer system, and/or power mirrors, etc. The body control module 108 includes circuits to, for example, drive relays (e.g., to control wiper fluid, etc.), drive brushed direct current (DC) motors (e.g., to control power seats, power locks, power windows, wipers, etc.), drive stepper motors, and/or drive LEDs, etc. In the illustrated example, the body control module 108 includes a Phone-as-a-Key (PaaK) unit 114 (sometimes referred to herein as a "key-phone" unit).

The PaaK unit 114 communicates with the mobile device 112 to facilitate a PaaK app executing on the mobile device 112 controlling functions of the vehicle 100 as if the mobile device 112 were a key fob. From time to time, the PaaK unit 114, via the wireless nodes 106 sends out a broadcast (sometimes referred to as "polling") to determine whether there are and/or to detect a presence of any paired mobile devices 112 in the vicinity of the vehicle 100. In response to receiving the polling broadcast, the mobile device 112 broadcasts responses to each of the wireless nodes 106 which include the RSSI at which the polling broadcast was received from the respective wireless nodes 106. For example, if the vehicle 100 includes six wireless nodes 106, the mobile device 112 may broadcast six responses, each with an identifier and the RSSI of one of the wireless nodes 106. Through an exchange of authentication tokens, the PaaK unit 114 communicatively couples to the mobile device 112 via one of the wireless nodes 106.

Figure 2A:
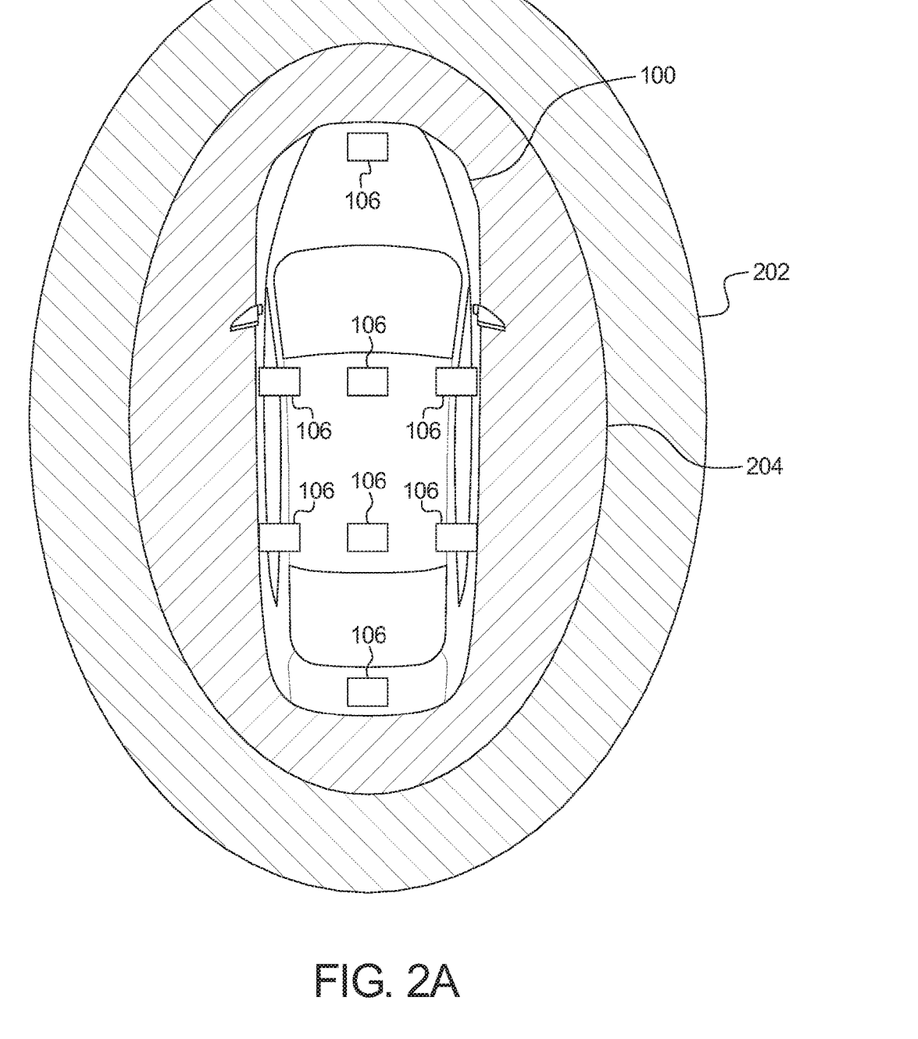
FIGS. 2A and 2B illustrate detection zones around the vehicle of FIG. 1.
Figure 2B:
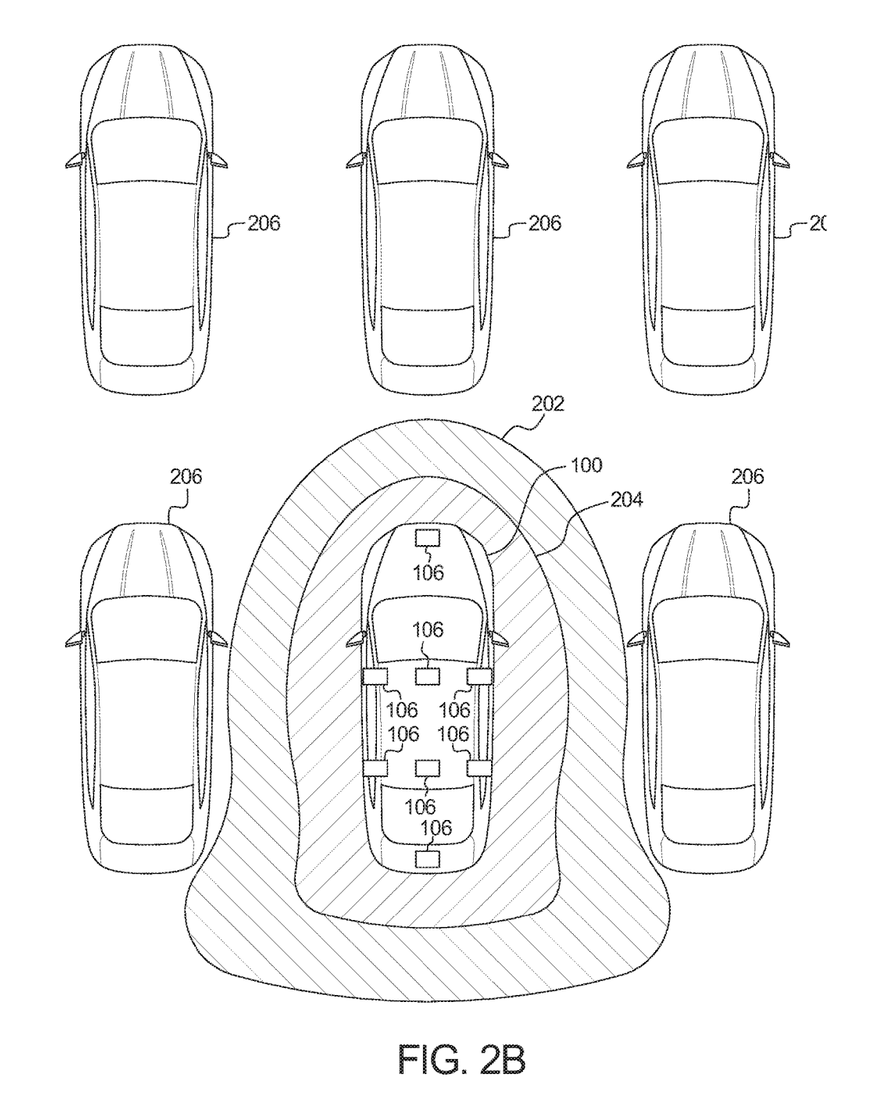

As illustrated in FIGS. 2A and 2B, the PaaK unit 114 uses a first RSSI threshold 202 and a second RSSI threshold 204 to define zones around the vehicle 100. The first RSSI threshold 202 defines a "welcome zone." When the mobile device 112 is in the welcome zone, the body control module 108 turns on welcome lights (e.g., interior and/or exterior light) and/or customizes vehicle interior preferences. The second RSSI threshold 204 defines a "passive entry zone." When the mobile device 112 is in the passive entry zone, the body control module 108 primes one or more of the doors to be unlocked. As used herein, "priming" refers to sending a signal to the door control unit to authorize unlocking the door in response to detecting a hand on the door handle.

The RSSI values of the first RSSI threshold 202 and the second RSSI threshold 204 depend on a density of objects in the vicinity of the vehicle 100. In response to initially detecting the mobile device 112, the PaaK unit 114 activates the range detection sensors 102 and/or the DSRC module 110 to detect the objects 206 (e.g., other vehicles, structural elements, etc.) in the vicinity (e.g., five feet, ten feet, etc.) of the vehicle. The PaaK unit 114 categorizes the density of objects into categories. In some examples, the PaaK unit 114 categorizes the density of objects into three categories. In a first category (e.g., a "High Density" category), the PaaK unit 114 detects a quantity of objects in the vicinity of the vehicle 100 that satisfies (e.g., is greater than) a first density threshold. For example, the first density threshold may be six objects 206. In the first category, the first RSSI threshold 202 and the second RSSI threshold 204 are relatively small. For example, the first RSSI threshold 202 and the second RSSI threshold 204 may be −60.0 dBm and −68.5 dBm respectively. In a second category (e.g., a "Medium Density" category), the PaaK unit 114 detects a quantity of objects in the vicinity of the vehicle 100 that satisfies (e.g., is greater than) a second density threshold, but does not satisfy the first density threshold. For example, the second density threshold may be three objects 206. In the second category, the first RSSI threshold 202 and the second RSSI threshold 204 are larger than when in the first category. For example, the first RSSI threshold 202 and the second RSSI threshold 204 may be −56.3 dBm and −66.2 dBm respectively. In a third category (e.g., a "Low Density" category), the PaaK unit 114 detects a quantity of objects in the vicinity of the vehicle 100 that do not satisfy second density threshold. In the third category, the first RSSI threshold 202 and the second RSSI threshold 204 are larger than when in the first and second categories. For example, the first RSSI threshold 202 and the second RSSI threshold 204 may be −53.9 dBm and −64.7 dBm respectively.

To determine whether the mobile device 112 is within the first RSSI threshold 202 or the second RSSI threshold 204, the PaaK unit 114 selects a subset of the RSSI values in the responses from the mobile device 112 sent in response to the same polling broadcast. In some examples, the PaaK unit 114 selects the two highest RSSI values. The PaaK unit 114 averages the selected RSSI values and compares the average to the first RSSI threshold 202 and the second RSSI threshold 204 to determine whether the mobile device 112 is in the welcome zone or the passive entry zone. For example, if the RSSI values from the mobile device 112 are [−60.2 dBm, −61.0 dBm, −63.8 dBm, −63.5 dBm, −59.8 dBm, −61.7 dBm], the average of the two largest values would be −60.0 dBm. In such an example, the PaaK unit 114 compares −60.0 dBm to the first RSSI threshold 202 and the second RSSI threshold 204.

Figure 3:
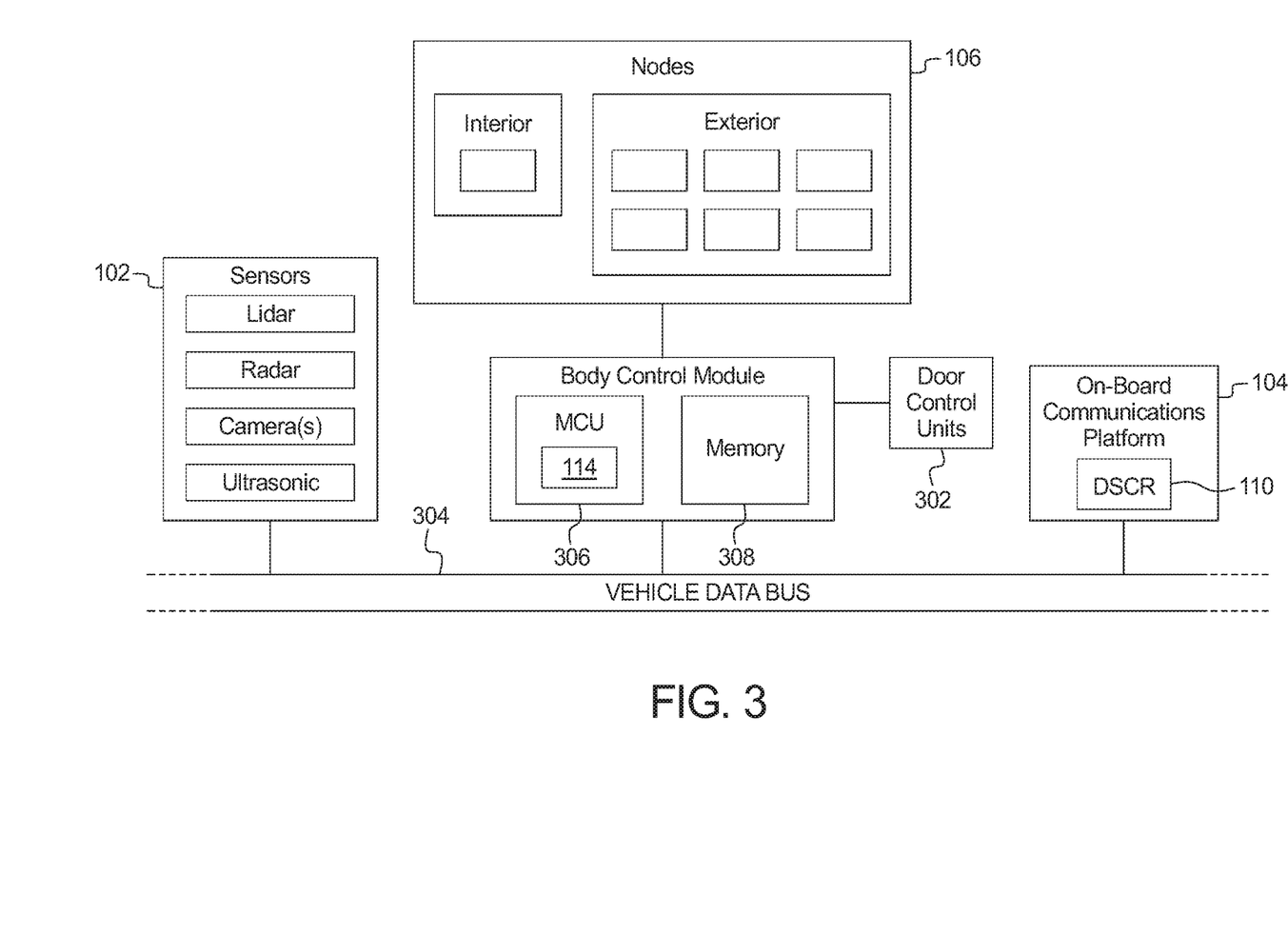
FIG. 3 is a block diagram of the electronic components of the vehicle of FIG. 1.

FIG. 3 is a block diagram of the electronic components 300 of the vehicle 100 of FIG. 1. In the illustrated example, the electronic components 300 include the sensors 102, the on-board communications platform 104, the wireless nodes 106, the body control module 108, door control units 302, and a vehicle data bus 304.

The body control module 108 includes a processor or controller 306 and memory 308. In the illustrated example, the body control module 108 is structured to include PaaK unit 114. The processor or controller 306 may be any suitable processing device or set of processing devices such as, but not limited to: a microprocessor, a microcontroller-based platform, a suitable integrated circuit, one or more field programmable gate arrays (FPGAs), and/or one or more application-specific integrated circuits (ASICs). The memory 308 may be volatile memory (e.g., RAM, which can include non-volatile RAM, magnetic RAM, ferroelectric RAM, and any other suitable forms); non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc). In some examples, the memory 308 includes multiple kinds of memory, particularly volatile memory and non-volatile memory.

The memory 308 is computer readable media on which one or more sets of instructions, such as the software for operating the methods of the present disclosure can be embedded. The instructions may embody one or more of the methods or logic as described herein. In a particular embodiment, the instructions may reside completely, or at least partially, within any one or more of the memory 308, the computer readable medium, and/or within the processor 306 during execution of the instructions.

The terms "non-transitory computer-readable medium" and "computer-readable medium" should be understood to include a single medium or multiple media, such as a centralized or distributed database, and/or associated caches and servers that store one or more sets of instructions. The terms "non-transitory computer-readable medium" and "computer-readable medium" also include any tangible medium that is capable of storing, encoding or carrying a set of instructions for execution by a processor or that cause a system to perform any one or more of the methods or operations disclosed herein. As used herein, the term "computer readable medium" is expressly defined to include any type of computer readable storage device and/or storage disk and to exclude propagating signals.

The door control units 302 controls various functions related to the corresponding door of the vehicle 100. For example, door control unit 302 controls a latch (e.g., an electronic latch), the position of the side view mirror and the position of the window. The door control unit 302 includes an electronic circuit (e.g., discrete components, integrated circuits, a processor, etc.) to, for example, control the latch, control actuators to move the window, and communicate via with the body control module 108. The door control unit 302 is electrically coupled to inputs (e.g., toggles, switches, buttons, etc.) to control the window and/or the latch.

In the illustrated example, the vehicle data bus 304 communicatively couples the sensors 102, the on-board communications platform 104, and the body control module 108. In some examples, the vehicle data bus 304 includes one or more data buses. The vehicle data bus 304 may be implemented in accordance with a controller area network (CAN) bus protocol as defined by International Standards Organization (ISO) 11898-1, a Media Oriented Systems Transport (MOST) bus protocol, a CAN flexible data (CAN-FD) bus protocol (ISO 11898-7) and/a K-line bus protocol (ISO 9141 and ISO 14230-1), and/or an Ethernet™ bus protocol IEEE 802.3 (2002 onwards), etc.

Figure 4:
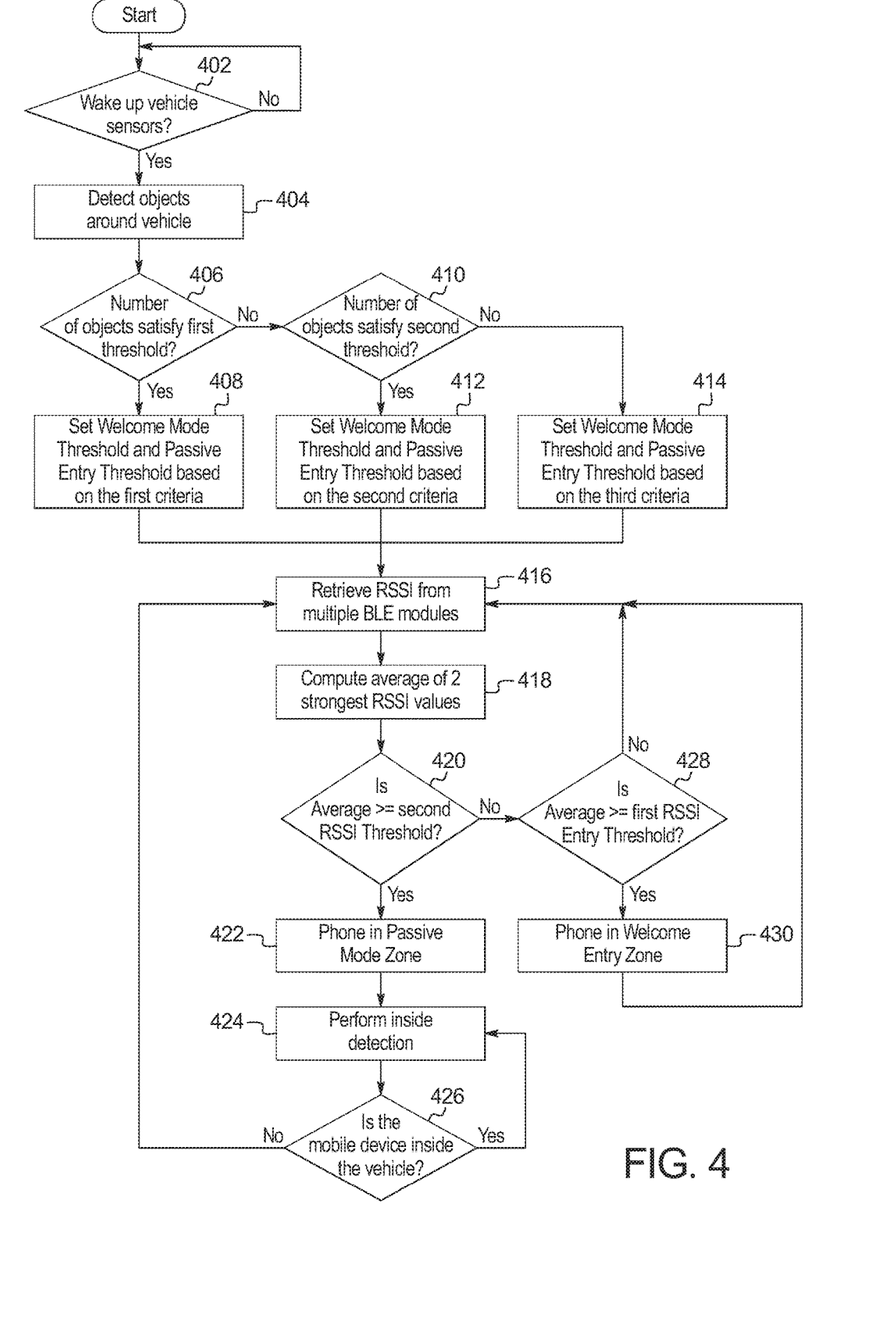
FIG. 4 is a flowchart of a method to localize a mobile device based on object detection, which may be implemented by the electronic components of FIG. 3.

FIG. 4 is a flowchart of a method to localize the mobile device 112 based on detection of objects 216 in the vicinity of the vehicle 100, which may be implemented by the electronic components 300 of FIG. 3. Initially, at block 402, the PaaK unit 114 waits until it is to wake up the range detection sensors 102 and/or the DSRC module 110. The PaaK unit 114 wakes up the range detection sensors 102 and/or the DSRC module 110 in response to detecting the mobile device 112 within range (e.g., via a polling broadcast). At block 404, the PaaK unit 114 detects objects 216 around the vehicle 100. At block 406, the PaaK unit 114 determines whether the quantity of the objects 216 around the vehicle 100 satisfy the first density threshold. If the quantity of the objects 216 around the vehicle 100 satisfies the first density threshold, the method continues to block 408. Otherwise, if the quantity of the objects 216 around the vehicle 100 does not satisfy the first density threshold, the method continues at block 410.

At block 408, the PaaK unit 114 sets the first RSSI threshold 202 threshold and the second RSSI threshold 204 based on the density of objects in the vicinity of the vehicle 100 to be in the high density category. At block 410, the PaaK unit 114 determines whether the quantity of the objects 216 around the vehicle 100 satisfy the second density threshold. If the quantity of the objects 216 around the vehicle 100 satisfies the second density threshold, the method continues to block 412. Otherwise, if the quantity of the objects 216 around the vehicle 100 does not satisfy the second density threshold, the method continues at block 414. At block 412, the PaaK unit 114 sets the first RSSI threshold 202 threshold and the second RSSI threshold 204 based on the density of objects in the vicinity of the vehicle 100 to be in the medium density category. At block 414, the PaaK unit 114 sets the first RSSI threshold 202 threshold and the second RSSI threshold 204 based on the density of objects in the vicinity of the vehicle 100 to be in the low density category.

At block 416, the PaaK unit 114 retrieves or otherwise receives the RSSI values received by the multiple wireless nodes 106 on the exterior of the vehicle 100. The RSSI values are received by the wireless nodes 106 from the same mobile device 112 in response to a polling broadcast. At block 418, the PaaK unit 114 computers the average of the two highest RSSI values. At block 420, the PaaK unit 114 determines whether the average RSSI value satisfies the second RSSI threshold 204. If the average RSSI value satisfies the second RSSI threshold 204, the method continues to block 422. Otherwise, if the average RSSI value does not satisfy the second RSSI threshold 204, the method continues at block 428.

At block 422, the PaaK unit 114 activates the passive entry mode by, for example, instructing the body control module 108 to prime the doors. At block 424, the PaaK unit 114 performs inside detection to determine whether the mobile device 112 is inside the vehicle 100. To perform inside detection, the PaaK unit 112 compares the RSSI values from the wireless nodes 106 on the exterior of the vehicle 100 to the RSSI value(s) from the wireless node(s) on the interior of the vehicle 100. At block 426, the PaaK unit 114 determines if the mobile device 112 is inside the vehicle 100. If the mobile device 112 is inside the vehicle 100, the method returns to block 424. Otherwise, if the mobile device 112 is not inside the vehicle 100, the method returns to block 416.

At block 428, the PaaK unit 114 determines whether the average RSSI value satisfies the first RSSI threshold 202. If the average RSSI value satisfies the first RSSI threshold 202, the method continues to block 430. Otherwise, if the average RSSI value does not satisfy the first RSSI threshold 202, the method returns to block 416. At block 430, the PaaK unit 114 activates the welcome mode by, for example, instructing the body control module 108 to, for example, illuminate one or more welcome lights (e.g., interior and/or exterior lights) of the vehicle.

The flowchart of FIG. 4 is representative of machine readable instructions stored in memory (such as the memory 308 of FIG. 3) that comprise one or more programs that, when executed by a processor (such as the processor 304 of FIG. 3), cause the vehicle 100 to implement the example PaaK unit 114 of FIGS. 1 and 3. Further, although the example program(s) is/are described with reference to the flowchart illustrated in FIG. 4, many other methods of implementing the example PaaK unit 114 may alternatively be used. For example, the order of execution of the blocks may be changed, and/or some of the blocks described may be changed, eliminated, or combined.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The terms "includes," "including," and "include" are inclusive and have the same scope as "comprises," "comprising," and "comprise" respectively.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A vehicle comprising:
   sensors to detect objects around the vehicle;
   wireless nodes to receive received signal strength (RSSI) values from a mobile device; and
   a phone key unit to:
      determine a quantity of the objects around the vehicle;
      determine a first RSSI threshold based on the quantity; and
      in response to an average of a portion of the RSSI values satisfying the first RSSI threshold, prime a door of the vehicle.

2. The vehicle of claim 1, wherein the sensors detect the objects around the vehicle in response to the phone key unit detecting a presence of the mobile device.

3. The vehicle of claim 1, wherein the phone key unit is to:
   determine a second RSSI threshold based on the quantity; and
   in response to the average of the portion of the RSSI values satisfying the second RSSI threshold, activate welcome lights of the vehicle.

4. The vehicle of claim 3, wherein the phone key unit is to, based on a quantity of the objects around the vehicle, determine that an area around the vehicle is in one of a first category, a second category, or a third category.

5. The vehicle of claim 4, wherein the first RSSI threshold and the second RSSI threshold are determined based on being in the first category, the second category, or the third category.

6. The vehicle of claim 1, wherein the wireless nodes include a first wireless node and a second wireless node on a first side of the vehicle, a third wireless node and a fourth wireless node on a second side of the vehicle, a fifth wireless node on a front of the vehicle, a sixth wireless node on a back of the vehicle, an a seventh wireless node inside the vehicle.

7. The vehicle of claim 1, wherein the portion of the RSSI values is two of the RSSI values.

8. A method comprising:
   detecting, via range detection sensors, objects around a vehicle;
   receiving, via a plurality of wireless nodes, received signal strength (RSSI) values from a mobile device;
   determining, via a processor, a quantity of the objects around the vehicle;
   determining a first RSSI threshold based on the quantity; and
   in response to an average of a portion of the RSSI values satisfying the first RSSI threshold, priming a door of the vehicle.

9. The method of claim 8, wherein detecting the objects around the vehicle is in response to detecting a presence of the mobile device.

10. The method of claim 8, including
    determining a second RSSI threshold based on the quantity; and
    in response to the average of the portion of the RSSI values satisfying the second RSSI threshold, activating welcome lights of the vehicle.

11. The method of claim 10, including, based on the quantity of the objects around the vehicle, determining that an area around the vehicle is in one of a first category, a second category, or a third category.

12. The method of claim 11, wherein the first RSSI threshold and the second RSSI threshold are determined based on being in the first category, the second category, or the third category.

13. The method of claim 8, wherein receiving the RSSI values from the mobile device includes:
    receiving first and second RSSI values from first and second wireless nodes on a first side of the vehicle;
    receiving third and fourth RSSI values from third and fourth wireless node on a second side of the vehicle;
    receiving a fifth RSSI value from a fifth wireless node on a front of the vehicle; and
    receiving a sixth RSSI value from a sixth wireless node on a back of the vehicle.

14. The method of claim 8, wherein the portion of the RSSI values is two of the RSSI values.

15. A tangible computer readable medium comprising instructions that, when executed, cause a vehicle to:
    detect, via range detection sensors, objects around the vehicle;
    receive, via a plurality of wireless nodes, received signal strength (RSSI) values from a mobile device;
    determine a quantity of the objects around the vehicle;
    determine a first RSSI threshold based on the quantity; and
    in response to an average of a portion of the RSSI values satisfying the first RSSI threshold, prime a door of the vehicle.

16. The tangible computer readable medium of claim 15, wherein the instructions cause the vehicle to:
    determine a second RSSI threshold based on the quantity; and
    in response to the average of the portion of the RSSI values satisfying the second RSSI threshold, activate welcome lights of the vehicle.

* * * * *

UNITED STATES PATENT AND TRADEMARK OFFICE
CERTIFICATE OF CORRECTION

PATENT NO. : 10,172,145 B2
APPLICATION NO. : 15/421179
DATED : January 1, 2019
INVENTOR(S) : Laura Viviana Hazebrouck It is certified that error appears in the above-identified patent and that said Letters Patent is hereby corrected as shown below:

In the Claims

In Column 9, Line 45, please delete and replace the text as shown:
The vehicle of claim 3, wherein the phone key unit is
to, based on the quantity of objects around the vehicle,
determine that an area around the vehicle is one of a first
category, a second category, or a third category.

Signed and Sealed this
Twenty-eighth Day of May, 2019

Andrei Iancu
*Director of the United States Patent and Trademark Office*